US009657884B1

(12) United States Patent
Carte et al.

(10) Patent No.: US 9,657,884 B1
(45) Date of Patent: May 23, 2017

(54) SEWER PIPE CRAWLER

(71) Applicant: The United States of America as Represented by the Secretary of the Air Force, Washington, DC (US)

(72) Inventors: David B. Carte, Colorado Springs, CO (US); Marko Podplatnik, Ljubjana (SI); Nathan Tangeman, Colorado Springs, CO (US); Nathan Davies, Colorado Springs, CO (US); Ryan Boedeker, Colorado Springs, CO (US); Kyle Fitle, Colorado Springs, CO (US); Christopher Caldrone, Colorado Springs, CO (US); Kelsey Brush, Colorado Springs, CO (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 70 days.

(21) Appl. No.: 14/697,589

(22) Filed: Apr. 27, 2015

Related U.S. Application Data

(60) Provisional application No. 61/984,363, filed on Apr. 25, 2014.

(51) Int. Cl.
*F16L 55/44* (2006.01)
*F16L 55/34* (2006.01)

(52) U.S. Cl.
CPC .............. *F16L 55/44* (2013.01); *F16L 55/34* (2013.01)

(58) Field of Classification Search
CPC ..... F16L 2101/30; F16L 55/28; F16L 55/179; F16L 55/32; F16L 55/44; F16L 55/34; B08B 9/049

(Continued)

(56) References Cited

U.S. PATENT DOCUMENTS 5,018,451 A 5/1991 Hapstack
5,121,694 A 6/1992 Zollinger
(Continued)

FOREIGN PATENT DOCUMENTS

DE 19859229 C2 7/2003
EP 1141612 B1 10/2001
WO 0037845 A1 6/2000

OTHER PUBLICATIONS

Balaji, An SMA-actuated, Compliant Mechanism-based Pipe-crawler, International Conference on Smart Materials Structures and Systems, Jul. 24-26, 2008, ISSS-2008/S96, Bangalore, India.
(Continued)

*Primary Examiner* — Mark Le
(74) *Attorney, Agent, or Firm* — AFMCLO/JAZ; Jason Sopko

(57) ABSTRACT

A pipe crawler for crawling inside a pipe having an inside wall includes a front leg assembly that has front legs and feet. It also includes a rear leg assembly that has rear legs and feet. The rear leg assembly is disposed at a distance from the front leg assembly. A midsection operably couples the front leg assembly to the rear leg assembly and is configured to extend and contract the distance between the front leg assembly and the rear leg assembly. A plurality of lever arms are pivotably coupled between the front legs and their corresponding assemblies. The lever arms, in response to a force applied in an orientation traveling from the front of the pipe crawler to the rear of the pipe crawler, are configured to redirect a portion of the force into a normal force between the feet and the pipe inside wall.

8 Claims, 3 Drawing Sheets

(58) Field of Classification Search
USPC .................................................. 104/138.2
See application file for complete search history.

(56) References Cited

U.S. PATENT DOCUMENTS

| | | | |
|---|---|---|---|
| 5,309,844 A | 5/1994 | Zollinger | |
| 6,123,027 A * | 9/2000 | Suyama | F16L 55/28 |
| | | | 104/138.2 |
| 6,427,602 B1 * | 8/2002 | Hovis | F16L 55/34 |
| | | | 104/138.1 |
| 2008/0245258 A1 * | 10/2008 | Herron | F16L 55/32 |
| | | | 104/138.2 |

OTHER PUBLICATIONS

Ostertag, Miniature Mobile Bristled In-Pipe Machine, International Journal of Advanced Robotic Systems, 2014, 11:189 | doi: 10.5772/59499.

Moghadam, In-Pipe Inspection Crawler Adaptable to the Pipe Interior Diameter, International Journal of Robotics and Automation, vol. 26, No. 2, 2011.

* cited by examiner

SEWER PIPE CRAWLER

CROSS REFERENCE TO RELATED PATENT APPLICATIONS

This application claims priority under 35 U.S.C. §119(e) from U.S. provisional application 61/984,363, filed Apr. 25, 2014 and tided "Pipe Robot and Adhesive Sensor Pellet." The invention description contained in that provisional application is incorporated by reference into this description.

RIGHTS OF THE GOVERNMENT

The invention described herein may be manufactured and used by or for the Government of the United States for all governmental purposes without the payment of any royalty.

BACKGROUND OF THE INVENTION

The present invention relates generally to pipe crawlers, and more specifically to a sewer pipe crawler for traveling up a sewer pipe against the flow of sewage.

Pipe crawlers for traveling inside pipes are used for such purposes as inspection and cleaning.

Typical prior art mechanisms for moving pipe crawlers through a pipe include wheels and cable driven systems.

Many prior art pipe crawlers use inchworm like mechanisms to move along the inside of a pipe.

Examples of such inchworm-like mechanisms are described in U.S. Pat. Nos. 5,018,451, 5,121,694 and 5,309,844 to Zollinger and Zollinger et al.; U.S. Pat. No. 5,018,451 to Hapstack; and, U.S. Pat. No. 6,427,602 to Holvis et al.

U.S. Pat. Nos. 5,018,451, 5,121,694 and 5,309,844 to Zollinger and Zollinger et al., and U.S. Pat. No. 5,018,451 to Hapstack describe using pneumatics to push, or extend, legs attached to one end of a pipe crawler radially outward against the inside wall of a pipe, then pneumatically extending the body of the pipe crawler to move an assembly of similar legs forward, pneumatically extending those forward legs radially outward against the inside of the pipe, then pneumatically pulling the rear leg assembly forward to advance the pipe crawler, and repeating those movements as necessary to move forward inside the pipe.

U.S. Pat. No. 6,427,602 to Holvis et al. similarly pneumatically extends and retracts a central body, and uses a cam action to force legs outward by movement of the pipe crawler.

A common aspect of such prior art pipe crawlers is that they are made for crawling through either mostly empty pipes or pipes carrying low viscosity gases.

A different problem from that solved by such prior art pipe crawlers, arising from a different need than inspection and cleaning, is the need for systems for aiding rescue of trapped personnel in collapsed mines, buildings, and underground facilities (UGFs). Such collapsed structures may be caused by such events as natural disasters and terrorist actions.

The first requirement for such rescues is situational knowledge, which must be rapidly acquired without endangering additional personnel or those already trapped.

One approach for obtaining such necessary information is sending a robotically controlled and instrumented pipe crawler through a sewer pipe.

Such an unmanned robotically controlled system could infiltrate collapsed structures and provide lifesaving situational awareness of such important information as the existence and status of trapped personnel and at least some knowledge of the physical integrity of any remaining structure.

Sewer pipes are different from other, more open, pipes, and typical prior art pipe crawlers cannot crawl against the pressure from flowing sewer effluent.

Reasons that such prior art pipe crawlers cannot crawl against the pressure from flowing sewer effluent include an inability to attach to inside pipe walls with sufficient force, complicated by that the blunt, or bluff, overall shapes of such prior art pipe crawlers significantly increase the drag against them from effluent, or any liquid, flow.

The prior art for cleaning and inspecting pipes carrying high viscosity fluids, such as oil pipelines, uses so-called pipeline pigs, essentially slugs that fit closely inside a pipe and are moved along the pipe by the movement of the oil already moving through the pipe.

There is, therefore, a need for pipe crawlers that can crawl through sewer and other pipes against a flow of both low and high viscosity fluids.

There is an additional need for pipe crawlers that can climb vertical inclines and maneuver through pipe bends and around obstructions.

SUMMARY OF THE INVENTION

To address this challenge, the teachings of the present invention provide a new inchworm-like motion pipe crawler that can crawl "upstream" against a fluid flow by a combination of front and rear leg assemblies configured such that, when their legs are extended against the pipe outside wall, at least part of any force directed toward the front of the pipe crawler is redirected through the legs against the inside wall of the pipe and an overall streamlined shape such that, when moving through a liquid, viscous drag on the pipe crawler dominates form drag.

The teachings of the present invention also include a flexible midsection of the pipe crawler.

An example embodiment of the teachings of the present invention includes lever actuated leg assemblies wherein the axis of each leg, when extended against the inside pipe wall, makes an acute angle with the axis of the midsection of the pipe crawler.

BRIEF DESCRIPTION OF THE DRAWINGS

The teachings of the present invention will be better understood from the accompanying drawings illustrating various aspects and example embodiments of the invention and its teachings.

DETAILED DESCRIPTION

While collapsed structures are inherently dangerous and difficult to infiltrate, they are not invulnerable to penetration. Various avenues of infiltration that have been identified are: power cables, entrances and exits for personnel and equipment, air intakes/exhausts, diesel combustion intakes and exhausts, water utilities and waste removal utilities. Analysis and research has illuminated the difficulty of infiltration by many of these methods due to the collapsed structure and blockades. One of the most promising ways to infiltrate a collapsed structure is through sewer pipes.

A pipe crawler can infiltrate through a sewer pipe system using a combination of expandable and collapsible legs that use friction force on the walls of the pipe to push and extend its way through the pipe system.

Figure 1:
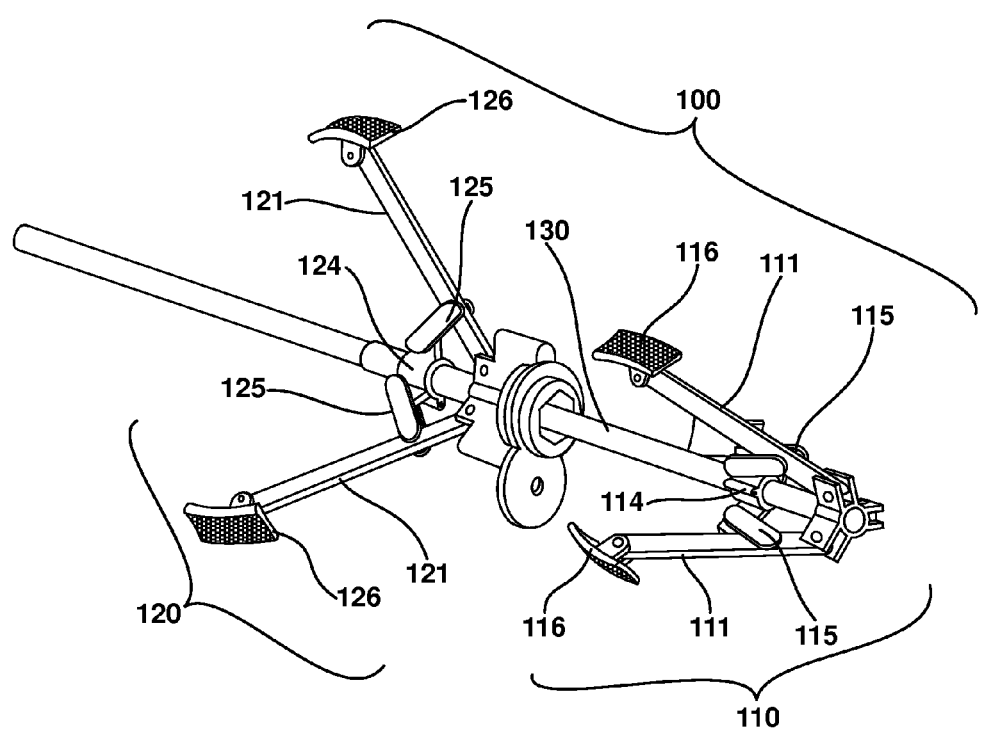
FIG. 1 is a simplified schematic drawing of an example embodiment of a sewer pipe crawler made according to the teachings of the present invention showing a front leg assembly in a retracted position and a rear leg assembly in an extended position.

FIG. 1 is a simplified schematic drawing of an example embodiment of a sewer pipe crawler 100 made according to the teachings of the present invention showing a front leg assembly 110 in a retracted position and a rear leg assembly 120 in an extended position.

Front leg assembly 110 and rear leg assembly 120 extend and contract legs 111 and legs 121, respectively, by moving sliders 114 and 124 along midsection center shaft 130. Movement of sliders 114 and 124 move lever arms 115 and 125, respectively, to extend and retract the legs.

Feet 116 and 126 contact the inside wall of a pipe to alternately hold front and rear leg assemblies 110 and 120 fixed against the pipe while midsection center shaft pushes forward front leg assembly, in this drawing, to advance pipe crawler 100 along the inside of a pipe.

As legs 121 and feet 126 of rear leg assembly 120 expand and create friction against the pipe walls, front leg assembly 110 will slide forward. Front assembly legs 111 will then expand or extend, holding pipe crawler 100 in place and allowing back leg assembly 120 to follow. This legged design, as opposed to common prior art wheeled pipe crawlers and pneumatically actuated inchworm-like approaches, allows sewer pipe crawler 100 to maintain a greatly reduced frontal surface area. A lower frontal area enables it to address variable pipe diameters more effectively, be more resistant to fluid drag, and pass through obstacles within the pipe.

Figure 2:
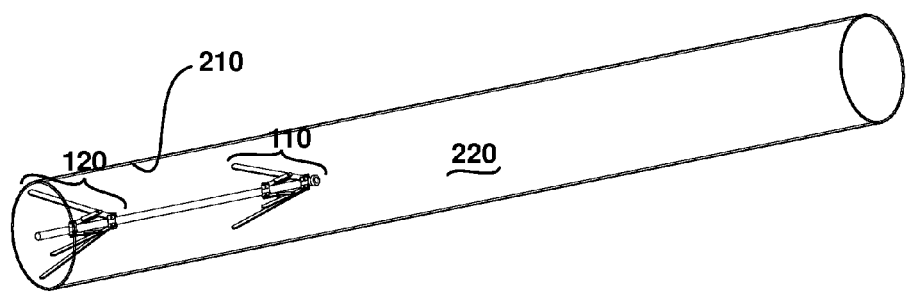
FIG. 2 is a simplified schematic drawing of an example embodiment of the sewer pipe crawler of FIG. 1, showing its front leg assembly in a retracted position and its rear leg assembly in an extended position pressed against the inside wall of the pipe.

FIG. 2 is a simplified schematic drawing of an example embodiment of sewer pipe crawler 100, showing front leg assembly 110 in a retracted position and rear leg assembly 120 in an extended position pressed against an inside wall 210 of a pipe 220.

Figure 3:
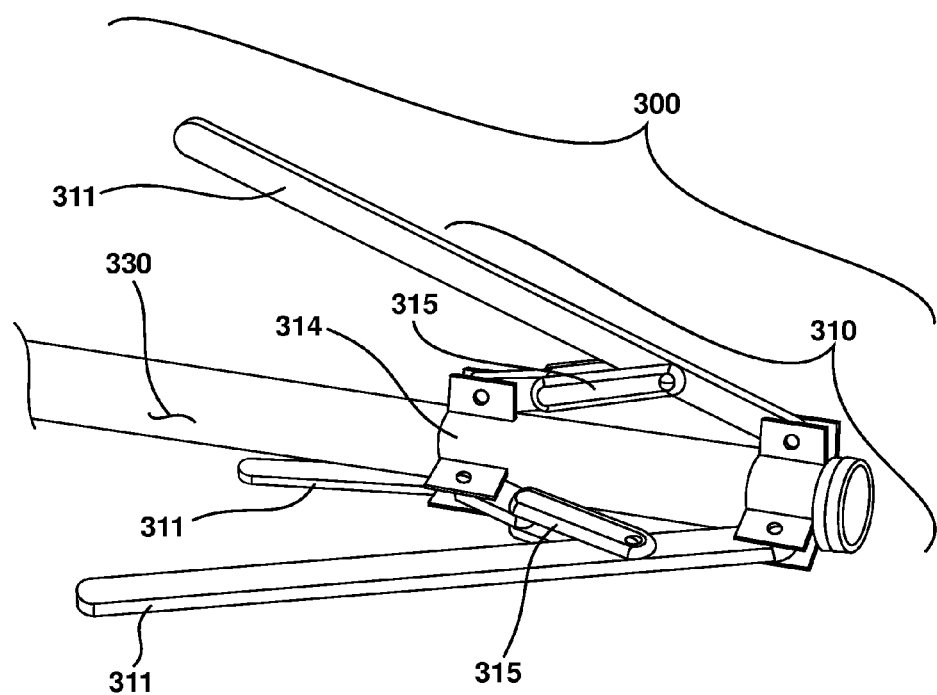
FIG. 3 is a simplified schematic drawing of an example embodiment of a sewer pipe crawler made according to the teachings of the present invention, showing a configuration for a front leg assembly.

FIG. 3 is a simplified schematic drawing of an example embodiment of a sewer pipe crawler 300 made according to the teachings of the present invention, showing a more close up view of a configuration for a front leg assembly 310.

Similar to the description for FIG. 1, front leg assembly 310 extends and contracts legs 311 by moving a slider 314 along a midsection center shaft 330. Movement of slider 314 moves lever arms 315 to extend and retract the legs.

As described in the Background of the Invention, prior art inchworm-like pipe crawlers are bluff, or blunt, bodies, creating significant drag. The concept of bluff versus streamlined bodies is a conventional engineering distinction when determining drag coefficients. Basically, a body is streamlined if friction drag (viscous drag) is greater than pressure drag and is a bluff body if pressure drag (form drag) dominates friction drag. That is, if little or no consideration is given to drag, as with prior art approaches, the components tend to have large surface areas perpendicular to the direction of movement creating significant so-called form drag, resulting in large wakes and turbulent flow. If almost any consideration is given to drag, as in the teachings of the present invention, then the resulting overall shape will be streamlined and tend to create a more laminar flow over and around the various components of pipe crawler.

Figure 4:
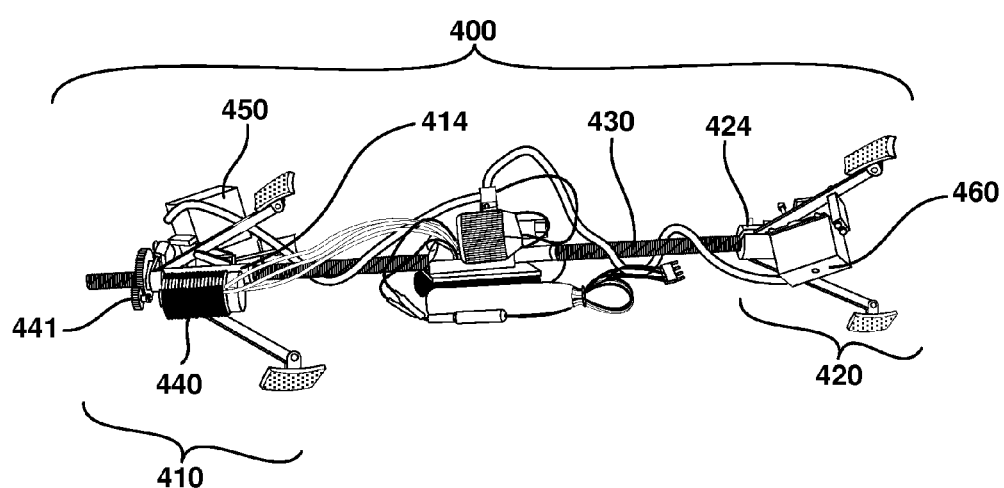
FIG. 4 is an image of an example embodiment of a sewer pipe crawler made according to the teachings of the present invention showing the location, in this example embodiment, of the motors for moving the midsection threaded center shaft and the front and rear leg assemblies.

FIG. 4 is an image of an example embodiment of a sewer pipe crawler 400 made according to the teachings of the present invention showing, in this example embodiment, a motor 440 and gears 441 for moving a threaded midsection center shaft 430 forward and back relative to a front leg assembly 410. Solenoids 450 and 460 move sliders 414 and 424 to extend and retract the legs on leg assemblies 410 and 420.

Figure 5:
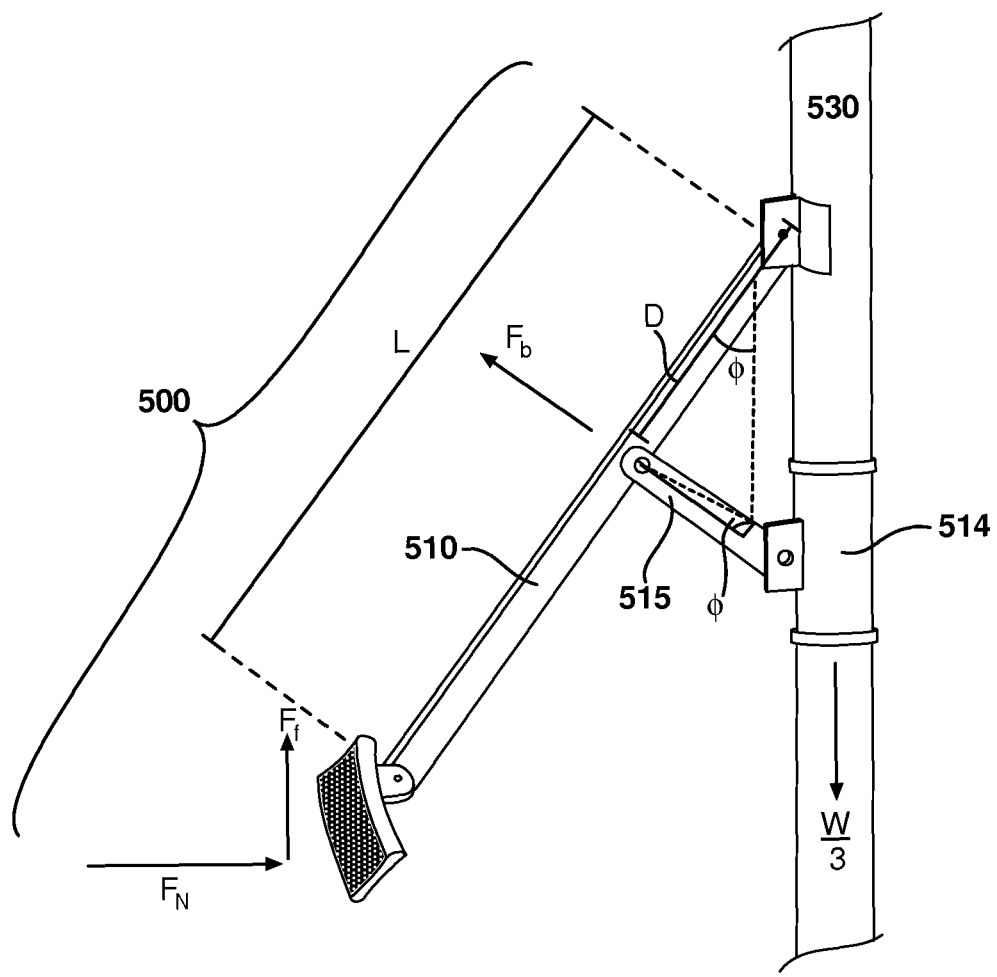
FIG. 5 is a drawing of an example embodiment of a locking angle for a leg assembly according to the teachings of the present invention.

FIG. 5 is a drawing of an example embodiment of a self-locking angle Ø for a leg assembly 500 according to the teachings of the present invention. A slider 514 is connected to a lever arm 515, in turn connected to a leg 510 such that a slider 514 slides along a midsection shaft 530, leg 510 extends or contracts.

A particular angle between the legs and pipe wall can be determined such that an additional force pushing the robot backwards increases the friction force by an amount greater than the pushing force. In this configuration, the robot will not slide backwards down the pipe, thereby allowing it to withstand a large amount of pushing force and allow it to climb vertically.

The sewer pipe crawler will include various sensors to enable gathering valuable information about the layout of a damaged structure, as well as other audio visual and electromagnetic data.

A pipe crawler according to the teachings of the present invention will need to be able to overcome obstacles within the pipes, including an ability to climb straight up in order to perform its function. This requires a large normal force, therefore a large friction force, placed against the sewer pipe walls. As described in relation to FIG. 5, the leg assemblies can be made self-exciting and self-locking brakes. In one example embodiment, a particular angle between the legs and wall can be determined such that an additional force pushing the robot backwards increases the friction force by an amount greater than the pushing force. In this configuration, the robot will not slide backwards down, or back along, the pipe, thereby allowing it to withstand a large pushing force from effluent flow, and also allow it to climb vertically.

Another obstacle is bends in a pipe, including 180 degree and S-bends. A flexible material used for the pipe crawler midsection, usually a flexible threaded pipe, allows the pipe crawler to navigate a 180 degree bend in the pipe with minimum extra applied force.

A potential failure mode is loss of communication because the signal strength is not strong enough. Due to the large amount of debris preventing direct entry, wireless communication with the pipe crawler likely will not be available. The pipe crawler could be connected using cables such as fiber optic cables or could be autonomous. Although using fiber optic cables would not add much weight to the system, such cables present a significant risk of breakage, leaving the pipe crawler stranded. For this reason, a pipe crawler according to the teachings of the present invention would likely be made autonomous by used of a programmed microcontroller. One option for receiving information gathered by the pipe crawler is to drop small relay signal pucks that will transmit data along a course a pipe crawler has passed and eventually to first responders.

The teachings of the present invention will allow rapid infiltration of collapsed structures, being capable of navigating autonomously through bends, obstructions, and operating in variable diameter piping.

Those having skill in the art of the invention will understand that while the present invention has been described primarily in terms of a sewer pipe crawler, it is not so limited and can be used for crawling inside any pipe, particularly pipes containing liquids and most particularly pipes containing flowing liquids.

Various other modifications to the invention as described may be made, as might occur to one with skill in the art of the invention, within the scope of the claims. Therefore, not all contemplated example embodiments have been shown in complete detail. Other embodiments may be developed without departing from the spirit of the invention or from the scope of the claims.

We claim:

1. A pipe crawler, having a front and a rear, for crawling inside a pipe having an inside wall, the pipe crawler comprising:
   (a) a front leg assembly having front legs and cooperating feet configured to extend outwardly against the pipe inside wall;
   (b) a rear leg assembly, having rear legs and cooperating feet configured to extend outwardly against the pipe inside wall, wherein the rear leg assembly is disposed at a distance from the front leg assembly;
   (c) a flexible midsection shaft made of a flexible material operably coupling the front leg assembly to the rear leg assembly, wherein the rear leg assembly is configured to selectively slide over the flexible midsection shaft to extend and contract the distance between the front leg assembly and the rear leg assembly;
   (d) a plurality of lever arms pivotably coupled between the front legs and the front leg assembly, and pivotably coupled between the rear legs and the rear leg assembly; and
   (e) wherein the lever arms, in response to a force applied in an orientation traveling from the front of the pipe crawler to the rear of the pipe crawler, are configured to redirect a portion of the force into a normal force between the feet and the pipe inside wall.

2. The pipe crawler according to claim 1, further comprising an axis along the midsection between the front leg assembly and the rear leg assembly and an axis along each leg of the front legs and rear legs, wherein the axis of each of the front legs and each of the rear legs, when extended, forms an acute angle with the axis of the midsection.

3. The pipe crawler according to claim 1, wherein an overall shape of the pipe crawler is such that, when moving through a liquid or sewage, viscous drag on the pipe crawler is greater than form drag.

4. The pipe crawler according to claim 1, wherein an overall shape of the pipe crawler is configured such that it has a viscous coefficient of drag greater than a form coefficient of drag.

5. The pipe crawler according to claim 2, wherein an overall shape of the pipe crawler is such that, when moving through a liquid, viscous drag on the pipe crawler is greater than form drag.

6. The pipe crawler according to claim 2, wherein an overall shape of the pipe crawler is configured such that it has a viscous coefficient of drag greater than a form coefficient of drag.

7. The pipe crawler according to claim 1, wherein the flexible midsection shaft comprises a flexible threaded pipe.

8. The pipe crawler according to claim 1, wherein the flexible midsection shaft comprises the flexible material allowing the pipe crawler to navigate a 180 degree bend.

\* \* \* \* \*